Dec. 15, 1970 S. A. AIJALA 3,546,975
SAW-TOOTH CUTTING MACHINE
Filed Sept. 23, 1968 3 Sheets-Sheet 1
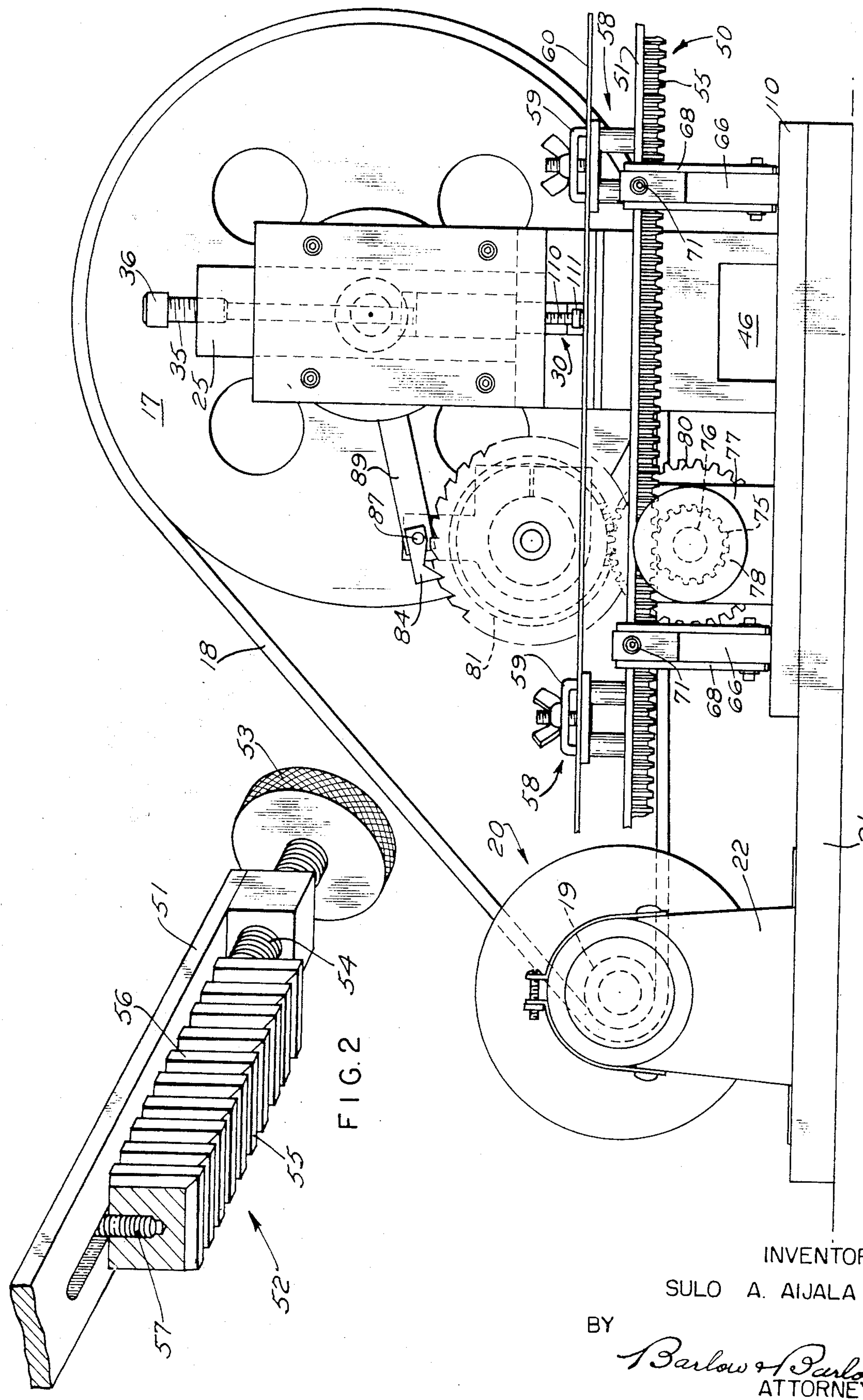
INVENTOR
SULO A. AIJALA
BY
Barlow & Barlow
ATTORNEYS

SAW-TOOTH CUTTING MACHINE

Filed Sept. 23, 1968 3 Sheets-Sheet 2

INVENTOR
SULO A. AIJALA
BY
Barlow & Barlow
ATTORNEYS

INVENTOR

SULO A. AIJALA

BY

Barlow & Barlow

ATTORNEYS 3,546,975
SAW-TOOTH CUTTING MACHINE
Sulo A. Aijala, Attleboro, Mass., assignor to Intricate Machine & Engineering Inc., a corporation of Massachusetts
Filed Sept. 23, 1968, Ser. No. 761,498
Int. Cl. B23d *65/02*
U.S. Cl. 76—29 6 Claims

ABSTRACT OF THE DISCLOSURE

A machine in which a saw blade is guided and fed in a straight line in a step by step feed with an eccentric on the main drive shaft for operating the feed. The feed is in two parts and may be adjusted as to the length of feed by a relative movement of the parts which are then clamped together in a desired setting. As the saw is fed in a straight line, a punch and die operate to cut notches forming teeth in the blade, the cutter or punch being generally triangular in shape and rotatable about the center axis of the punch in order to set the desired angle of the teeth making it unnecessary to move the saw blade to accomplish this.

CROSS REFERENCE TO RELATED APPLICATIONS

This application is related to a saw-tooth setting machine application No. 761,500, filed Sept. 23, 1968 and to a Saw-Tooth Sharpening application Ser. No. 608,579 filed Jan. 11,1967.

BACKGROUND OF THE INVENTION

In saw-tooth cutting machines there is usually provided some sort of a punch and die for cutting notches in the edge of the saw blade, and if different angles are desired for the teeth, then some adjustment is made for feeding the saw in a different rectilinear path at an angle to such punch and die. This is a cumbersome method by reason of the length of the saw which needs to be adjusted for such operation and requires substantial space for operation. As to the feeding of the saw, this is usually done by the reciprocating of the punch to operate some step by step feed, and this does not allow for accurate adjustment of the amount of feed such as may be obtained by the present invention.

SUMMARY OF THE INVENTION

The saw blade to be cut is guided through the machine in a straight line path regardless of the angle which the teeth are to be cut. The feed may be adjusted by means of an adjustable eccentric driven positively from the drive shaft of the machine by a relative setting of two discs, one of which carries an eccentric. The punch and die which cuts the notches in the edge of the blade are rotatably mounted about the axis of the punch so that the triangular shape of the punch may be adjusted to provide the angle desired of the saw teeth with reference to the linear dimension of the blade.

DESCRIPTION OF THE DRAWINGS

FIG. 1 is an elevation of the machine with the carrier for the saw blade and the saw blade broken away at both ends;

FIG. 2 is a fragmental perspective view of one end of the carrier for the saw blade;

DESCRIPTION OF THE PREFERRED EMBODIMENT

Figure 3:
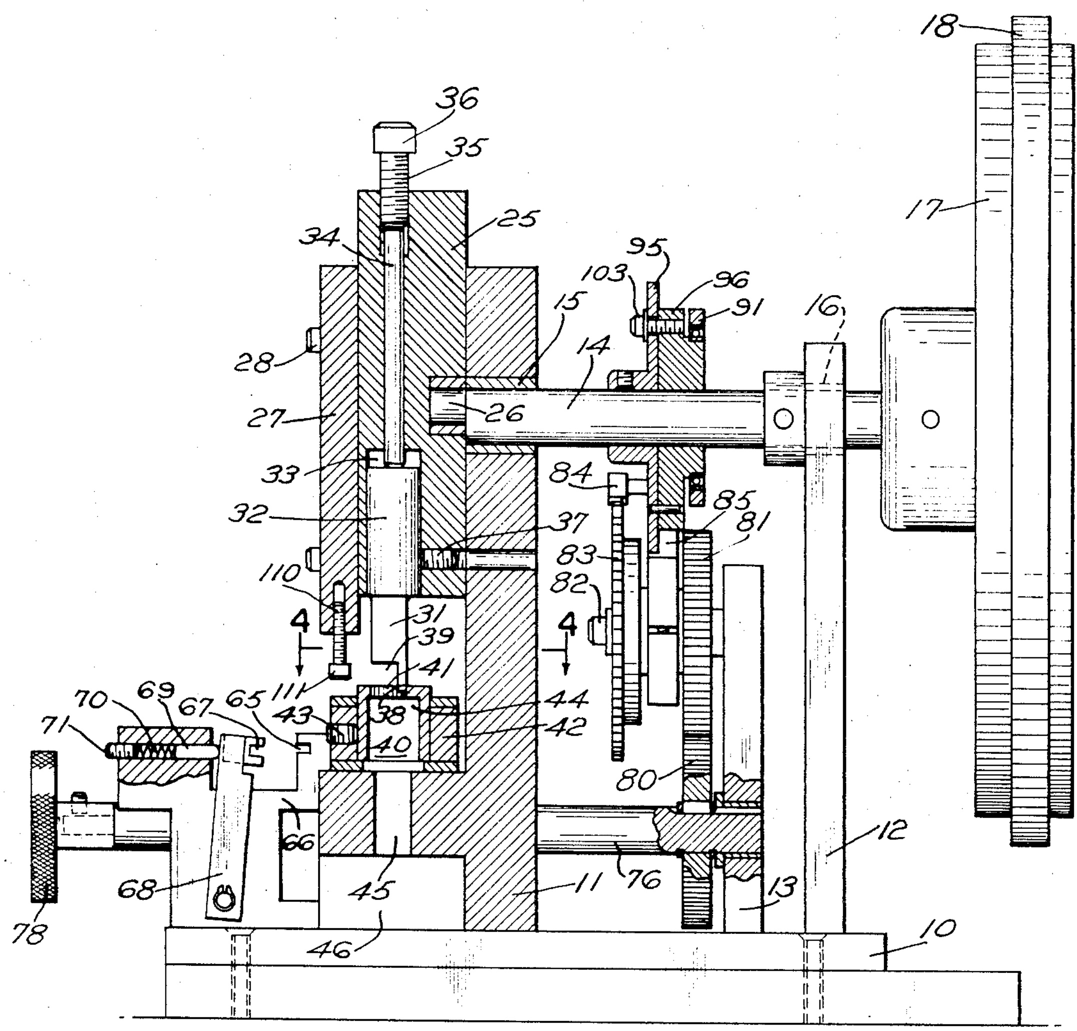
FIG. 3 is a sectional view substantially through the punch and die.

A base 10 mounts upright supports 11 and 12 and 13 as seen in FIG. 3 with a drive shaft 14 having bearings 15 and 16 in the upright supports 11 and 12 which shaft is rotated by pulley 17 driven by belt 18 from pulley 19 (FIG. 1) on motor 20 mounted upon the platform 21 by means of a stand 22.

A plunger 25 is slidably mounted for vertical reciprocation in a guide channel of support 11 and is reciprocated by eccentric 26 on the end of shaft 14. A face plate 27 held on the support 11 by screws 28 closes the guide channel and may be removed for access to the plunger as desired.

Figure 4:
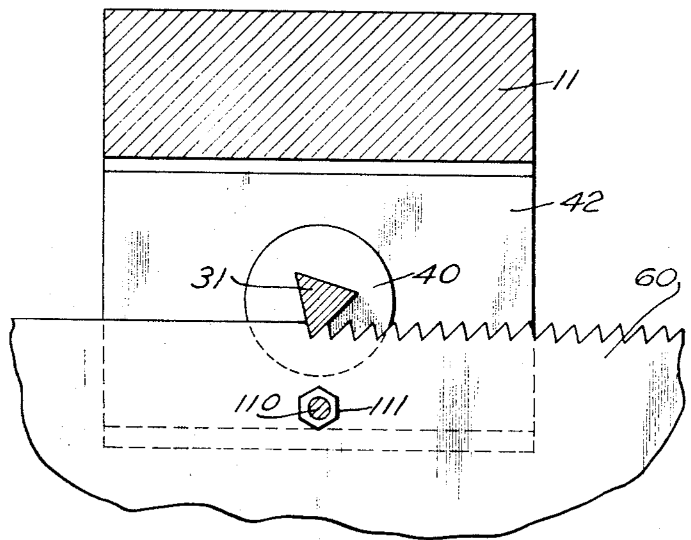
FIG. 4 is a sectional view on substantially line 4—4 of FIG. 3.
Figure 5:
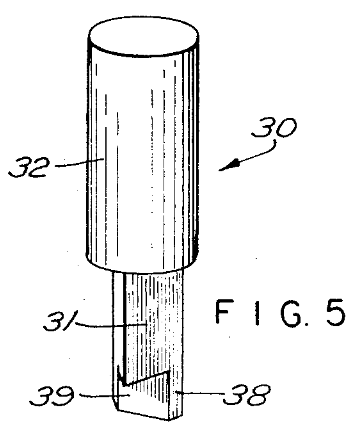
FIG. 5 is a perspective view of the punch.

A punch designated generally 30 (see FIG. 5) comprises a triangular shape tool 31 and a cylindrical portion 32 which is mounted in the cylindrical bore 33 of the plunger 25. It is backed up by a pin 34 and screw 35 having a head 36 enabling it to be adjusted to position the punch axially of the bore 33. This punch may be held against rotation by a screw 37 threaded in a bore in the plunger 25 and accessible through a hole in the upright support 11. A die 40 having an opening 41 of a triangular shape to interfit with the punch receives the lower portion 38 of the punch guiding the punch in its movement at all times, the lower end of this tool is cut away as at 39 to permit the work which is operated to be moved beneath the triangular cutting edge of the punch (see FIG. 4). This die is rotatably mounted in a block 42 which is fixed on the support 11 and this die 40 may be held in its adjusted rotative position by the set screw 43. The die and plunger will be rotated together in order to provide the desired angle of the tooth with reference to the longitudinal dimension of the saw blade. The die is hollow as at 44 and the chips which are cut may pass through the bore 45 of the support 11 into some container for these chips which may rest on the base 10 in the recess 46.

A saw blade carrier designated generally 50 comprises a bar 51 (see FIGS. 1 and 2) with a rack designated generally 52 located beneath this bar 51 and adjustable relative to the bar by means of a hand wheel 53 and threaded shaft 54. This rack has teeth 55 on its lower edge and also rack teeth 56 on its side edge so that the saw carrier may be moved from the cutting machine to a setting machine and then to a sharpening machine without removing the blade from the carrier. The setting machine is set forth in greater detail in an application filed the same date as this application and the sharpening machine is shown in my application Ser. No. 608,579 filed Jan. 11, 1967. When the rack is adjusted, a screw 57 may be utilized for holding it in position relative to the bar 51. Mounted upon this bar 51 there are a plurality of saw blade mounting devices designated generally 58 (FIG. 1) and comprising clamps 59 to hold a blade 60 in position. The bar 51 is guided in slots 65 (FIG. 3) in upright 66 (see FIGS. 1 and 3) and in slots 67 (FIG. 3) in arms 68 which are urged toward slot 65 by pins 69 pressed by means of springs 70 which may be adjusted as to tension by set screws 71. By this arrangement the saw blade is maintained in substantially a horizontal plane and slidably guided in this plane and in the same rectilinear path during the operation of the punch on the blade in various settings of the punch about its axis.

The rack teeth 55 mesh with a gear 75 (FIG. 1) on shaft 76 mounted in standards 77 and 13 in suitable bearings. A handle 78 on the end of this shaft 76 at the front of the machine serves to rotate the gear 75 for rapidly moving the carriage to the desired location.

Figure 6:
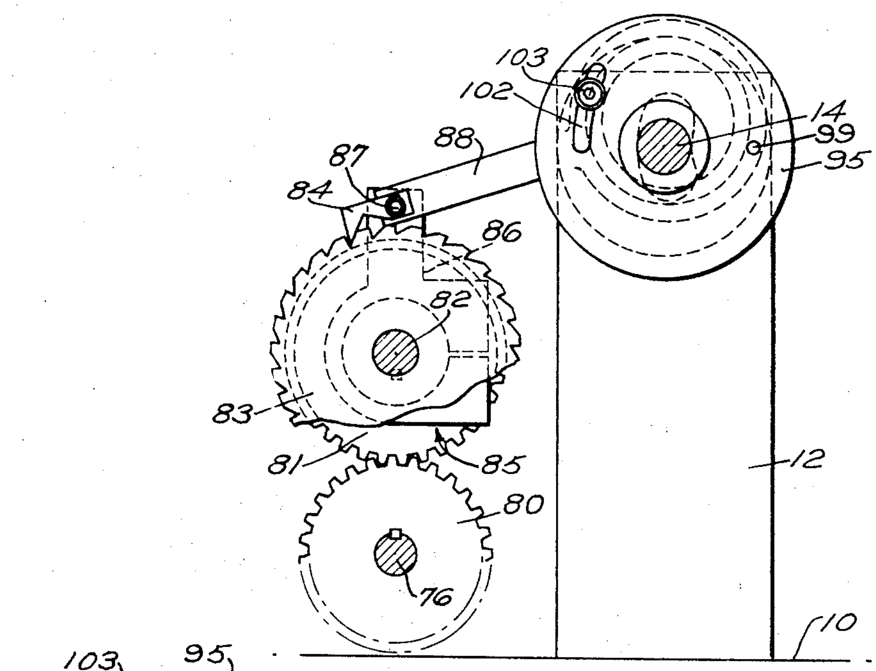
FIG. 6 is an elevation of the feeding mechanism of the machine.
Figure 7:
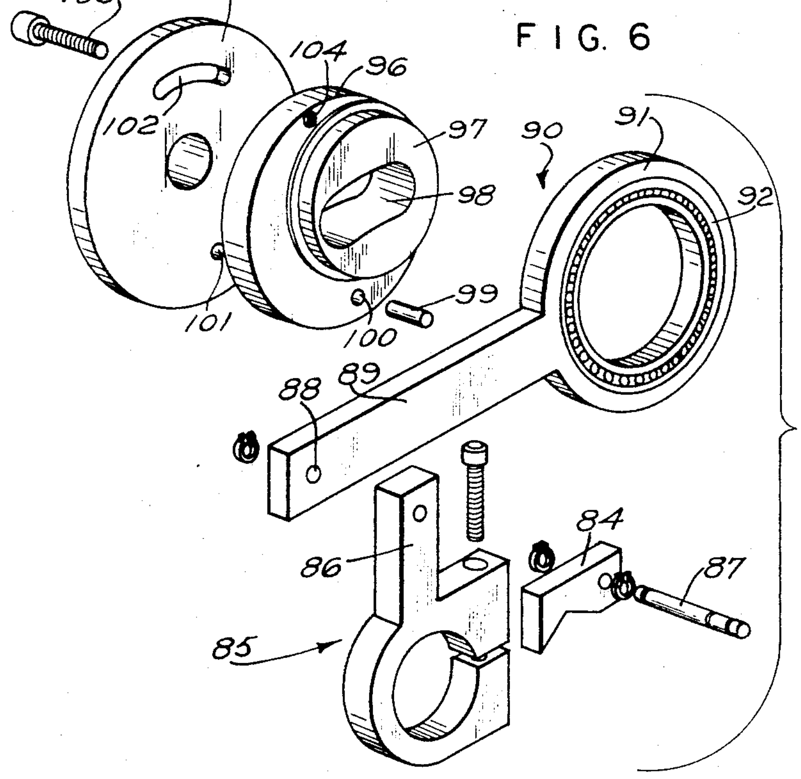
FIG. 7 is an exploded view in perspective of the various parts of the feeding mechanism.

Shaft 76 and its gear 75 are mechanically fed by means of gear 80 keyed to shaft 76 and change gear 81 rotatably mounted on the upright support 13 on shaft 82 which carries a ratchet wheel 83. The pawl for operating ratchet wheel 83 is designated 84 and is mounted on yoke 85 (see FIGS. 6 and 7) which yoke embraces the shaft 82 and has an arm 86 which extends from this yoke and pivotally mounts pawl 84 by a pin 87 which extends through the opening 88 in arm 89 of member 90 having an eccentric embracing loop 91 equipped with a ball bearing 92.

This pawl 84 is reciprocated from drive shaft 14 by means of a disc 95 coupled to a disc 96 carrying an eccentric 97. A slot 98 enables the two discs 95 and 96 to be relatively positioned to adjust the position of the eccentric with reference to the shaft 14 upon which the discs are mounted so as to adjust the throw of the eccentric which operates in the loop 91 and ball bearing 92. These discs may be moved one on the other about pivot pin 99 which connects them and extends through hole 100 in disc 96 and hole 101 in disc 95. The disc 95 is slotted as at 102 and a threaded screw 103 passing thru slot 102 and into threaded opening 104 serves to bind the two parts together when adjusted to the desired position about the pivot pin 99. Thus the longitudinal motion of the pawl may be varied by relatively adjusting the discs 95 and 96 which makes for a very simple arrangement of adjustment.

A bolt 110 threaded into the lower end of the face plate 27 serves as a guide by means of its head 111 which engages the blade 70 to keep the blade against the die as the punch is operating.

I claim:

1. In a saw-tooth cutting machine, a support, a plunger movable toward and from said support, a die mounted on said support, a punch interfitting with said die and mounted in said plunger for reciprocation therewith with reference to said die, means for mounting said die and punch for rotation about the axis of the punch with reference to their mountings and means for holding said die and punch in their position of rotation whereby the angle of the teeth cut may be varied.

2. In a saw-tooth cutting machine as in claim 1 wherein means are provided for guiding a blade to be cut in a linear path through the machine.

3. In a saw-tooth cutting machine as in claim 2 wherein a carrier provides a mounting for the saw and said carrier has a rack for feeding the same.

4. In a saw-tooth cutting machine, a drive shaft, a first means operated by said shaft for punching out saw teeth, a second means operated from said drive shaft independent of said first means for feeding a blade to be cut, said second means comprising a change of gears, a ratchet wheel and pawl and an eccentric on said shaft operating said pawl, said eccentric comprising two relatively adjustable parts to vary the throw of the eccentric with reference to the axis of said shaft.

5. In a saw-tooth cutting machine as in claim 4 wherein said two parts are pivoted together on an axis parallel to said shaft and means to clamp said parts together.

6. In a saw-tooth cutting machine as in claim 5 wherein said parts are pivoted together and one part is provided with an arcuate slot and the other with a pin passing through said slot for clamping said parts together.

References Cited

UNITED STATES PATENTS

| | | | |
|---|---|---|---|
| 2,407,821 | 9/1946 | Engle | 76—29 |
| 2,514,567 | 7/1950 | Daggett | 76—29 |

BERNARD STICKNEY, Primary Examiner

U.S. Cl. X.R.

83—559, 693, 917